US 12,021,896 B2

(12) United States Patent
Sambamoorthy et al.

(10) Patent No.: US 12,021,896 B2
(45) Date of Patent: *Jun. 25, 2024

(54) METHOD FOR DETECTING WEBPAGE SPOOFING ATTACKS

(71) Applicant: ARMORBLOX LLC, San Jose, CA (US)

(72) Inventors: Arjun Sambamoorthy, Cupertino, CA (US); Prashanth Arun, Cupertino, CA (US); Holly Pike, Cupertino, CA (US); Chris Wang, Cupertino, CA (US); D J Sampath, Cupertino, CA (US); Salil Kanetkar, Cupertino, CA (US)

(73) Assignee: Armorblox LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/077,155

(22) Filed: Dec. 7, 2022

(65) Prior Publication Data
US 2023/0104884 A1      Apr. 6, 2023

Related U.S. Application Data

(63) Continuation of application No. 17/715,836, filed on Apr. 7, 2022, now Pat. No. 11,632,395.

(60) Provisional application No. 63/172,031, filed on Apr. 7, 2021.

(51) Int. Cl.
*H04L 9/40* (2022.01)
*H04W 12/12* (2021.01)

(52) U.S. Cl.
CPC ...... *H04L 63/1483* (2013.01); *H04L 63/1416* (2013.01); *H04W 12/12* (2013.01)

(58) Field of Classification Search
USPC ............................................. 726/23
See application file for complete search history.

(56) References Cited

U.S. PATENT DOCUMENTS

| | | | | |
|---|---|---|---|---|
| 9,407,658 | B1* | 8/2016 | Kuskov | G06F 21/566 |
| 2016/0191548 | A1* | 6/2016 | Smith | G06F 21/554 |
| | | | | 726/23 |
| 2017/0075877 | A1* | 3/2017 | Lepeltier | G06F 40/117 |
| 2018/0097837 | A1* | 4/2018 | Stolarz | G06N 20/00 |
| 2020/0184278 | A1* | 6/2020 | Zadeh | G06N 3/044 |
| 2020/0228500 | A1* | 7/2020 | Olumofin | G06F 40/30 |

(Continued)

*Primary Examiner* — Sakinah White Taylor
(74) *Attorney, Agent, or Firm* — Lee & Hayes P.C.

(57) ABSTRACT

A method for detecting spoofed webpages includes: accessing an email; and scanning the email for links. The method also includes, in response to detecting a link in the email: accessing web content contained in a target webpage at the link; extracting target visual features from the web content; accessing a set of verified webpage templates, each verified webpage template in the set of verified webpage templates containing a set of verified features present in a verified webpage associated with a verified resource locator; identifying a particular verified webpage template, in the set of verified webpage templates, containing a particular set of verified features approximating the target visual features; characterizing a difference between the link and a particular verified resource locator associated with the particular verified webpage template; and, in response to the difference exceeding a threshold difference, flagging the email as malicious.

20 Claims, 5 Drawing Sheets

(56) References Cited

U.S. PATENT DOCUMENTS

2020/0358798 A1\* 11/2020 Maylor ............... H04L 63/1433
2022/0237238 A1\* 7/2022 Koide ................. H04L 63/1425

\* cited by examiner

US 12,021,896 B2

METHOD FOR DETECTING WEBPAGE SPOOFING ATTACKS

CROSS-REFERENCE TO RELATED APPLICATIONS

This Application is a continuation application of a U.S. patent application Ser. No. 17/715,836, filed on 7 Apr. 2022, which claims the benefit of U.S. Provisional Application No. 63/172,031, filed on 7 Apr. 2021, each of which is incorporated in its entirety by this reference.

TECHNICAL FIELD

This invention relates generally to the field of Internet security and more specifically to a new and useful method for detecting webpage spoofing attacks in the field of Internet security.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. First Method

Figure 1:
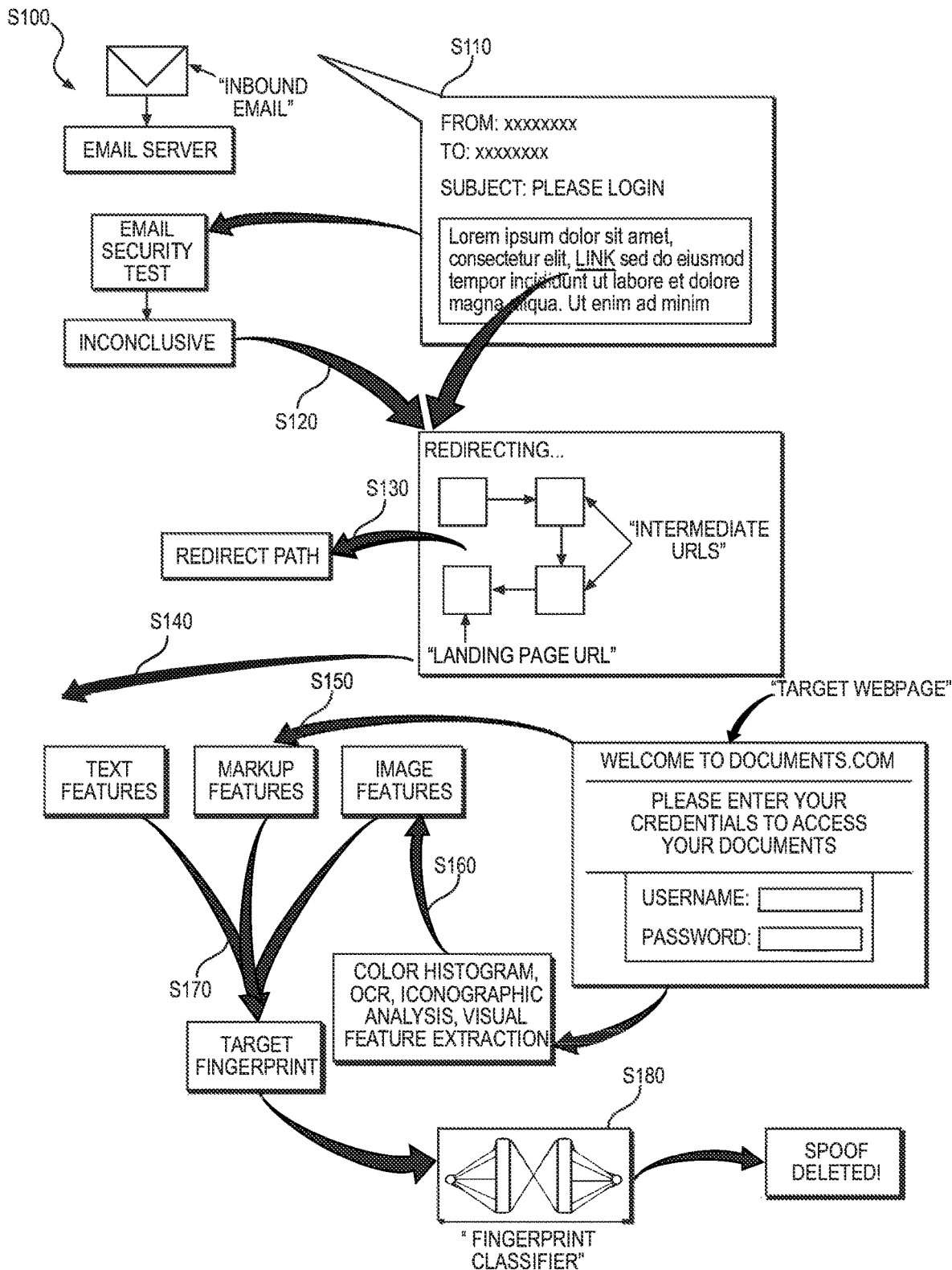
FIG. 1 is a flowchart representation of a first method.

As shown in FIG. 1, a first method S100 for detecting a spoofed webpage includes: accessing (e.g., intercepting) an inbound email including a Uniform Resource Locator (or "URL") of a target webpage in Block 110; in response to failing to classify the inbound email based on characteristics of the inbound email, accessing the target webpage based on the URL of the target webpage in Block S120; capturing a redirect path for the target webpage in Block S130; based on the target webpage, extracting a set of text features in Block S140, a set of markup features in Block S150, and a set of visual features in Block S160; generating a target fingerprint (or "template") for the target webpage including the redirect path, the set of text features, the set of markup features, and the set of visual features in Block S170; and executing a spoof classification model based on the target fingerprint and a corpus of fingerprinted webpages (or "verified webpage templates") to classify the target webpage as a spoofed webpage (or a "malicious webpage") in Block S180.

1.1 Applications

Generally, a computer system, which can include a computer network and/or security server (hereinafter "the system") interfaces (e.g., via an API) with an email server (e.g., and SMTP or IMAP server) to: intercept an incoming email to the email server; identify and follow a URL for a target webpage embedded in the incoming email; extract a set of visual features from the target webpage; and classify the target webpage as a spoofed webpage based on the set of visual features. More specifically, the system can attempt to classify the incoming email as a spoofing attack and, correspondingly, classify the target webpage as a spoofed webpage based on a series of classification phases culminating in visual feature extraction and analysis of the target webpage. For each phase of the first method S100, upon failing to conclusively classify (e.g., with greater than a threshold confidence) the target webpage as either a spoofed webpage or trusted webpage, the system proceeds to a subsequent phase characterized by an increase in compute resources over the previous phase. Additionally, as the system executes these phases, the system can extract various features (including visual features) of the target webpage and aggregate these features into a "fingerprint" of the target webpage. If, upon completion of a visual analysis phase, the system has not conclusively classified the target webpage as either a spoofed webpage or a trusted webpage, the system can execute a fingerprint classifier that compares the fingerprint of the target webpage to a corpus of trusted, and untrusted webpages to classify the target webpage as a spoofed webpage or a trusted webpage.

Thus, the system successively allocates computational resources in an attempt to resolve remaining uncertainty in a series of classification phases while aggregating features extracted from the target webpage during each phase into a fingerprint representing the target webpage. If the system has not classified the target webpage as either a spoofed webpage or a trusted webpage after completing prior phases, the system can extract a set of visual features from the target webpage and compare the fingerprint (including the visual features) to a corpus of labeled fingerprints via a fingerprint classifier. Although visual feature extraction and subsequent fingerprint-based classification may be computationally intensive, by executing these Blocks of the first method S100, the system can autonomously identify spoofing attacks with high accuracy in view of Internet security challenges, such as incomplete URL blacklists, incomplete URL whitelists, and advanced spoofing techniques (e.g., markup-reflected content spoofing, domain forwarding).

1.2 Webpage Fingerprinting

Generally, the system can extract various features from a target webpage in order to create a fingerprint for the target webpage and to generate a corpus of fingerprinted websites with which to train the fingerprint classifier. In particular, upon accessing a URL of a target webpage, the system can: capture a redirect path for the target webpage; extract a set of text features based on the target webpage; extract a set of markup features from the target webpage; and/or extract a set of visual features from the target webpage. Thus, the system can generate a comprehensive representation of a target webpage including features relevant to Internet security concerns.

1.2.1 Redirect Path

Generally, the system can capture a redirect path for the target webpage in Block S130. More specifically, the system can capture a number of redirects between the initial URL and a landing page, and additionally record the domain of the initial URL, the landing page URL, and each intermediate URL along the redirect path. Thus, the system can better compare malicious redirect patterns intending to hide the identity of the target webpage to trusted webpages of a user or customer.

1.2.2 Text Feature Extraction

Generally, the system can extract a set of text features based on the target webpage in Block S140. More specifically, the system can identify text within elements (e.g., HTML elements) in markup language code of the target webpage; and extract a set of text features from the identified text. Thus, the system can better identify patterns indicative of spoofing attacks based on text features of the target webpage.

In one implementation, the system can execute a natural language processing model (hereinafter "NLP model") in order to identify words, phrases, and/or concepts from the identified text of the target webpage. The system can then store these identified words, phrases, or concepts as text features of the target webpage.

In another implementation, the system can identify particular misspelled words or a frequency of misspellings in the target webpage as text features of the target webpage.

In yet another implementation, the system can extract the locations of text on the target webpage based on each markup element from which the text was extracted as a text feature of the target webpage. Therefore, in this implementation, the system can later detect inconsistencies within the target webpage by identifying regions of the target webpage for which the text is obscured by images or not rendered as expected on the target webpage.

1.2.3 Markup Feature Extraction

Generally, the system can extract a set of markup features based on the target webpage in Block S150. More specifically, the system can extract the type of element as well as the overall structure of elements of the target webpage based on the markup language code of the target webpage. Thus, the system can characterize the markup code organization of each target webpage in order to compare web development styles of a target webpage to a corpus of trusted and/or previously evaluated webpages.

In one implementation, the system can extract the HTML node tree of the target webpage and store this tree as a markup feature of the target webpage. In addition to storing the overall structure of the node tree, the system can store the type of each node represented in the tree. Thus, the system can compare the underlying HTML structure of the target webpage to a corpus of trusted webpages via the fingerprint classifier.

In another implementation, the system can extract the location of each element in order to detect proximity between particular text features and particular markup features on the target webpage. For example, the system can detect proximity of a word "login" to a text entry field, represented as an HTML element, on the target webpage.

1.2.4 Visual Feature Extraction

Generally, the system can extract a set of visual features based on the target webpage in Block S160. More specifically, the system can: render the target webpage via a browser environment (e.g., a virtual browser executed by the system); and capture a pixel-accurate image of the target webpage. The system can then analyze the image of the target webpage in order to extract particular visual features from the target webpage, such as a color histogram based on the image of the target webpage, text represented within the image of the target webpage, known icons present within the image of the target webpage, and/or any other visual feature of the target webpage. Thus, the system can generate features representing the actual visual features of the target webpage in order to compare these visual features to the underlying markup code and to compare these visual features with visual features of trusted webpages via the fingerprint classifier.

In one implementation, the system can render the target webpage via a set of virtual browsers executed by the system (e.g., desktop and mobile browsers). Additionally or alternatively, the system can render the target webpage in multiple window sizes in order to expose potential discrepancies between spoofed webpages and trusted webpages.

In another implementation, the system can execute the above steps based on individual image elements embedded in the target webpage alternatively or in addition to executing the above steps on a fully encompassing image of the target webpage. Thus, the system may conserve computational resources in exchange for a reduction in the ability to detect visual features that span multiple image elements in the target webpage.

1.2.5 Color Histogram

In one implementation, the system can generate a color histogram as a visual feature based on the image of the target webpage. In this implementation, the system can sample color values from each pixel in the image of the target webpage and calculate a color distribution or histogram based on the sampled color values. Thus, the system can represent the color scheme characterizing the target webpage as a visual feature of the target webpage and detect differences in this color scheme between the target webpage and a corpus of trusted webpages.

1.2.6 Optical Character Recognition

In one implementation, the system can execute an OCR model based on the image of the target webpage in order to extract text represented within image elements of the target webpage. Thus, the system can detect attempts to obfuscate detection of potentially suspicious text within image elements of the target webpage.

In this implementation, in addition to extracting text itself from the image of the target webpage, the system can also indicate the location of each extracted character from the image of the target webpage. Thus, the system can compare optically detected text on the target webpage to text extracted from the markup code of the target webpage, thereby identifying potentially suspicious discrepancies between the two sources of text for the target webpage.

1.2.7 Iconographic Analysis

In one implementation, the system can execute an iconography model configured to identify known commercial icons from images, generate a confidence score for each, and detect the location of each icon on the target webpage. Thus, the system can identify icons included on the webpage and compare the location and visual appearance to icons present in a corpus of trusted webpages.

In one example of this implementation, upon identifying a particular icon in the target image with greater than a threshold confidence, the system can detect the resolution of the icon and compare the resolution of the icon in the image and compare that to a known resolution of the icon when present on a trusted webpage.

1.2.8 General Visual Feature Extraction

In one implementation, the system can execute feature detection algorithms on the image of the target webpage in order to extract general visual features representing the overall visual appearance of the target webpage. For example, the system can execute edge detection, corner detection, shape detection, and/or a scale invariant feature transform and store features output by these algorithms as visual features of the target webpage. Thus, the system can capture visual features of the target webpage that result from multiple adjacent or overlapping images, a combination of images and other elements of the webpage (e.g., such as iFrames or other webpage embedded documents).

1.3 Library Curation and Validation

Generally, the system can repeatedly execute Blocks S120, S130, S140, S150, and S160 in order to curate a library of fingerprinted webpages labeled as either trusted or malicious. More specifically, the system can: access a selection of domains (e.g., from a list of common domains) frequently accessed by a customer organization; and fingerprint a set of webpages (e.g., login pages, landing pages, or other entry points) from each selected domain to generate a library of relevant fingerprint webpages for the customer organization. Additionally or alternatively, the system can also access known spoofing attempts associated with each domain in order to provide training examples of possible spoofing tactics for the fingerprint classifier. In another variation, the system can generate multiple libraries, each corresponding to a particular domain in the set of selected domains, in order to train domain-specific fingerprint classifiers for execution by the system. Thus, the system can generate a set of fingerprinted and labeled websites to serve as training examples for one or more fingerprint classifiers with which the system can evaluate potentially spoofed webpages.

In one implementation, the system can periodically access known access points of a domain in the set of selected domains in order to periodically update the library of fingerprinted examples. Correspondingly, the system can date each fingerprinted webpage in order to indicate the recency of the training example to the fingerprint classifier training algorithm. Additionally, upon accessing a previously fingerprinted webpage and detecting a change relative to a previous version of the webpage, the system can relabel the previously fingerprinted webpage as outdated, thereby enabling the fingerprint classifier to detect spoofing attempts that utilize outdated versions of a trusted webpage.

In another implementation, the system can, upon successfully fingerprinting and detecting a spoofed webpage, label the fingerprinted webpage as a malicious webpage and include labeled fingerprints of the spoofed webpage as a training example for the fingerprint classifier. Thus, by curating several labeled libraries of fingerprinted webpages, the system can provide a diverse set of training examples with one or more fingerprint classifiers, as is further described below.

1.4 Classifier Training

Generally, the system can train a fingerprint classifier configured to classify a target webpage as trusted or malicious based on a redirect path, a set of text features, a set of markup features, and/or a set of visual features. Alternatively, the system can train a domain-specific fingerprint classifier configured to classify a target webpage as either a legitimate webpage from a particular domain in a set of domains or an attempted spoof of a particular domain in the set of domains. For example, the system can train a domain-specific fingerprint classifier configured to classify a target webpage as a legitimate webpage from one of a predetermined set of 100 popular domains.

In particular, the fingerprint classifier can receive, as input, a fingerprint representing a target webpage and output a classification vector indicating a set of confidence scores corresponding to a set of domain classifications. In one implementation, the system can train a fingerprint classifier that outputs a classification vector including only positively identified trusted domains. Therefore, in this implementation, a classification vector of all zeros (e.g., the lack of confidence in any domain classification) indicates a spoofed webpage.

Alternatively, the system can train a fingerprint classifier that outputs a classification vector including a pair of confidence scores for each domain in the set of domains. In this implementation, a first value in the pair of confidence scores for each domain indicates a likelihood that the target webpage is a legitimate webpage of the domain, while a second value in the pair of confidence scores indicates a likelihood that the target webpage is a spoofing attempt of a webpage of the domain. Alternatively, the classification vector can represent these pairs of scores as a single confidence score with a range from negative one to one, for which a value of negative one indicates 100 percent confidence that the target webpage is a spoofed webpage in the domain and a value of one indicates 100 percent confidence that the target webpage is a legitimate webpage in the domain. Therefore, in this implementation, the system can indicate relative likelihoods that the target webpage is a spoofing attempt or that the target webpage is a legitimate webpage for each domain in the set of domains.

In another implementation, the system can train a fingerprint classifier that outputs a classification vector including a single confidence score indicating the likelihood that the target webpage is a spoofing attempt of a webpage from any domain, while including domain-specific confidence scores for positive identification of webpages from each domain in a set of domains.

In yet another implementation, the system can train a domain classifier configured to classify a target webpage as belonging to a particular domain in the set of domains (without classifying whether the target webpage is a spoofing attempt or a legitimate webpage). In this implementation, the system also trains a set of domain-specific fingerprint classifiers for each domain in the set of domains such that each domain-specific fingerprint classifier is configured to output two confidence scores: a first confidence score indicating the likelihood that the target webpage is a spoofing attempt; and a second confidence score indicating the likelihood that the target webpage is a legitimate webpage belonging to the domain. Thus, in this implementation, the system executes a domain classifier and then, based on the output of the domain classifier, executes a domain-specific classifier based on the fingerprint of the target webpage.

In yet another implementation, the system can train a domain-agnostic fingerprint classifier that outputs a classification vector including only two confidence scores (or a single confidence score from negative one to one) indicating that the target webpage is either a spoofed webpage or a legitimate webpage without also classifying the domain. In this implementation, the system can apply this more generalized fingerprint classifier to target webpages for which the associated domain is uncertain.

In any of the above implementations, each training example for the fingerprint classifier includes a fingerprint of an example webpage and a label represented as a classification vector indicating the true classification of the example webpage in one of the formats described above.

Once the system has accessed the set of training examples for the fingerprint classifier, the system can execute a machine learning algorithm (such as a backpropagation algorithm) or another statistical technique to train the fingerprint classifier.

Additionally, the system can periodically retrain the fingerprint classifier (or set of fingerprint classifiers) as the system accesses new examples of spoofing attempts or accesses legitimate webpages for the set of domains.

1.5 Spoof Detection

Figure 2:
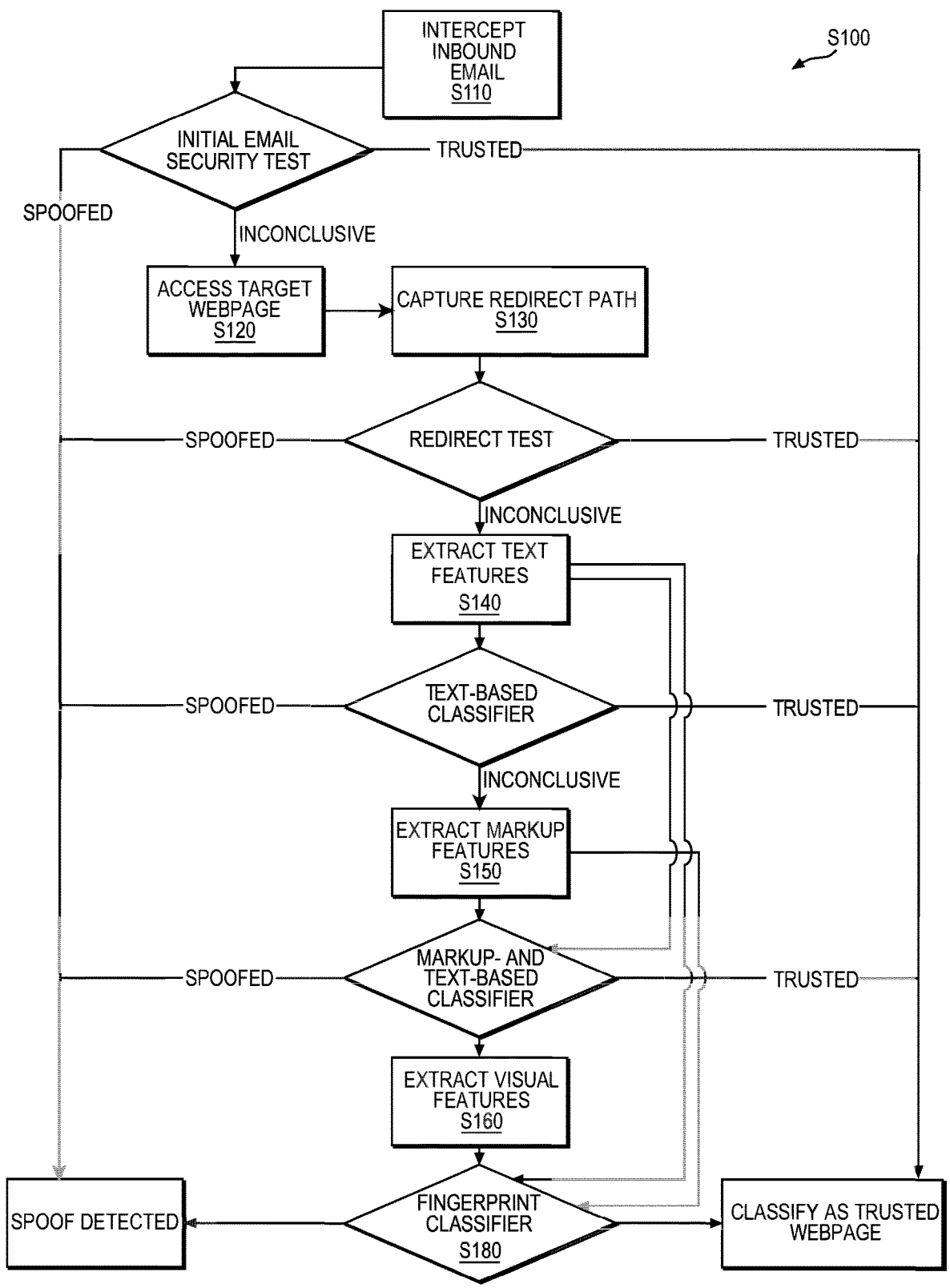
FIG. 2 is a flowchart representation of one variation of the first method.

Generally, as shown in FIG. 2, the system can detect spoofed webpages linked via email by: ingesting an email; identifying a suspicious URL based on the content of the email; accessing the target webpage; extracting features for the target webpage by executing Blocks S130, S140, S150, and S160; executing a series of independent tests (i.e., independent of the curated set of training examples) characterized by increasing compute resources; and, in response to an inconclusive result for each of the series of independent tests, executing a fingerprint classifier to identify the target webpage as a spoofed webpage or as a legitimate webpage. Thus, the system progresses from less compute intensive tests (e.g., redirect path testing) toward more compute intensive tests (e.g., visual feature tests) until a complete fingerprint has been generated for the target video. At this point, this system can execute the fingerprint classifier as a final test in determining whether the target webpage is a spoofed webpage or a legitimate webpage.

Each step of the aforementioned process is described in further detail below.

1.5.1 Email Ingest

Generally, in Block S110, the computer system can access an inbound email including a URL of a target webpage from a sender to a recipient within an email domain, computer network, or organization more generally. For example, the computer system can intercept the email at a SMTP or IMAP server before the email is delivered to the designated recipient. In another example, the computer system can access and analyze an email by interception or introspection via an API integration with an email exchange.

The computer system can also access both emails inbound from outside of the domain or computer network and emails routed inside of the domain or computer network.

Once the system has accessed the inbound email, the system can scan the content of the email for suspicious keywords or phrases and detect URLs embedded in the email. More specifically, the system can execute an initial email security test based on the text content of the email in an attempt to classify the email as a suspicious email or a trusted email; in response to failing to classify the email as either suspicious or trusted with greater than a threshold confidence, the system can identify any URL and execute URL following, as described below, in order to access a target webpage.

1.5.2 URL Detection and Following

Generally, in response to failing to classify the inbound email based on characteristics of the inbound email, the system can access the target webpage based on the URL of the target webpage in Block S120. More specifically, the system can open the URL with one or more virtual browsers executed by the system and, in the process of opening the URL, capture a redirect path for the target webpage as described above with respect to Block S130. The system can then execute a redirect test to evaluate whether the target webpage is likely to be a spoofing attempt.

In one implementation, the system can compare intermediate URLs included in the redirect path of the target webpage to a set of whitelisted domains. In response to detecting that all intermediate URLs are characterized by a domain in the set of whitelisted domains, the system can identify the webpage as a trusted webpage. Additionally or alternatively, the system can: compare a set of intermediate URLs included in the redirect path of the target webpage to a set of blacklisted domains; and, in response to detecting that a domain of a URL in the set of intermediate URLs is included in set of blacklisted domains, identify the webpage as a spoofed webpage.

In another implementation, the system can: calculate a number of redirects in the redirect path of the target webpage; and, in response to the number of redirects exceeding a threshold number of redirects, identify the target webpage as a spoofed webpage.

If the system does not conclusively classify the target webpage as either a spoofed webpage or a trusted webpage based on the redirect test described above, the system proceeds to a subsequent analysis phase described below.

1.5.3 Text Feature Analysis

Generally, upon accessing the target webpage, the system can: extract a set of text features from the target webpage, as described above with respect to Block S140; and execute a text feature analysis (e.g., via a text-based classifier) in an attempt to classify the target webpage as either a spoofed webpage or a trusted webpage. Thus, the system can analyze the text of the target webpage before progressing to more computationally intensive phases of analysis further described below.

In one implementation, the system can execute the text feature analysis by comparing text features extracted from the webpage to a set of suspicious words or phrases maintained by the system. In response to identifying that the target webpage includes a threshold number of suspicious words or phrases, the system can identify the target webpage as a spoofed webpage.

Additionally or alternatively, the system can execute a text-based classifier configured to classify the target webpage as either spoofed or trusted based on the set of text features. In this implementation, the system can train the text-based classifier according to training methods described above with respect to the fingerprint classifier. However, instead of using a full fingerprint of the target webpage, the system can train the text-based classifier based on training examples that include a set of text features for an example webpage and a label of the example webpage.

If the system does not conclusively classify the target webpage as either a spoofed webpage or a trusted webpage based on the text feature analysis described above, the system can proceed to a subsequent analysis phase described below.

1.5.4 Markup Feature Analysis

Generally, upon failing to classify the target webpage via the text feature analysis described above, the system can: extract a set of markup features from the target webpage as described with respect to Block S150; and attempt to classify the target webpage by executing a markup-based classifier based on the set of markup features. Thus, the system can execute a relatively low-compute analysis of the markup features of the target webpage before extracting visual features from the target webpage, which is a relatively high-compute operation.

In one implementation, the system can execute a markup-based classifier configured to classify the target webpage as either spoofed or trusted based on the set of markup features. In this implementation, the system can train the markup-based classifier according to training methods described above with respect to the fingerprint classifier. However, instead of using a full fingerprint of the target webpage, the system can train the markup-based classifier based on training examples that include a set of markup features for an example webpage and a label of the example webpage. In another implementation, the system can train the markup-based classifier based on a partial fingerprint of each example webpage in the set of training examples. In this implementation, the partial fingerprint of each example webpage can include the set of markup features extracted from the example webpage, the set of text features extracted from the target features, and/or the redirect path of the example webpage. Therefore, in this implementation, the system can generate a partial fingerprint for the target webpage and execute the markup-based classifier based on the partial fingerprint for the target webpage. Thus, the system can fully utilize any features already extracted from the target webpage according to prior Blocks of the first method S100.

If the system does not conclusively classify the target webpage as either a spoofed webpage or a trusted webpage based on the markup feature analysis described above, the system can proceed to a subsequent visual analysis phase, as described below.

1.5.5 Visual Feature Analysis

Generally, upon failing to classify the target webpage via the text feature analysis and via markup feature analysis described above, the system can: extract a set of visual features from the target webpage, as described above, with respect to Block S160; and classify the target webpage by executing a fingerprint classifier based on the full fingerprint of the target webpage. More specifically, the system can: generate a target fingerprint for the target webpage including, the redirect path, the set of text features, the set of markup features, and the set of visual features in Block S170; and execute a fingerprint classifier based on the target fingerprint and the corpus of example webpages to classify the target webpage as a spoofed webpage in Block S180. Thus, after exhausting lower-compute options, the system can extract visual features and analyze the target webpage based on the complete fingerprint of the target webpage in order to make a conclusive determination as to whether the target webpage is a spoofed webpage or a trusted webpage.

In one implementation, the system can: execute the fingerprint classifier to output a classification vector including a confidence score indicating a likelihood that the target webpage is a spoofed webpage; and, in response to the confidence score exceeding a threshold likelihood, classify the target webpage as a spoofed webpage. Thus, the system can execute the fingerprint classifier and classify the target webpage based on the classification vector.

In another implementation, the system can: execute a domain classifier to identify a domain of the target webpage; select a domain-specific fingerprint classifier; execute the domain-specific fingerprint classifier to generate a confidence score; and, in response to the confidence score exceeding a threshold confidence score, classify the target webpage as a spoofed webpage. Thus, the system can first execute a domain classifier to identify the domain that a target webpage may be attempting to spoof and then execute a domain specific fingerprint classifier to classify the target webpage.

Upon classifying the target webpage as a spoofed webpage, the system can cooperate with the email server to withhold the email containing the URL of the target webpage from the intended recipient. Alternatively, the system can modify or attach warning to the email indicating that there is a high likelihood of the email being a spoofing attempt. In another alternative implementation, the system can cooperate with the email server to redirect the email to a "junk" or "spam" folder associated with the intended recipient of the email.

1.6 Feedback

In one implementation, the system can receive feedback from a user or administrator of the system indicating the accuracy or inaccuracy of the classification of the target webpage. For example, the system can receive a report from a user (via a user interface integrated with an email application or via a separate reporting interface) indicating that the system generated a false negative (e.g., failed to detect a spoofing attempt) or a false positive (e.g., falsely detected a spoofing attempt). In this implementation, upon receiving feedback from a user or administrator identifying a classification for a target webpage, the system can: retrieve a fingerprint of the target webpage; associate a label with the fingerprint of the target webpage indicating the reported classification of the target webpage; generate a new training example based on the fingerprint of the target webpage and the label of the target webpage; and append the new training example to the set of training examples for the fingerprint classifier. Thus, the system can correct for misidentified webpages over time by adding new and informative training examples to the corpus of fingerprinted webpages.

2. Second Method

Figure 3:
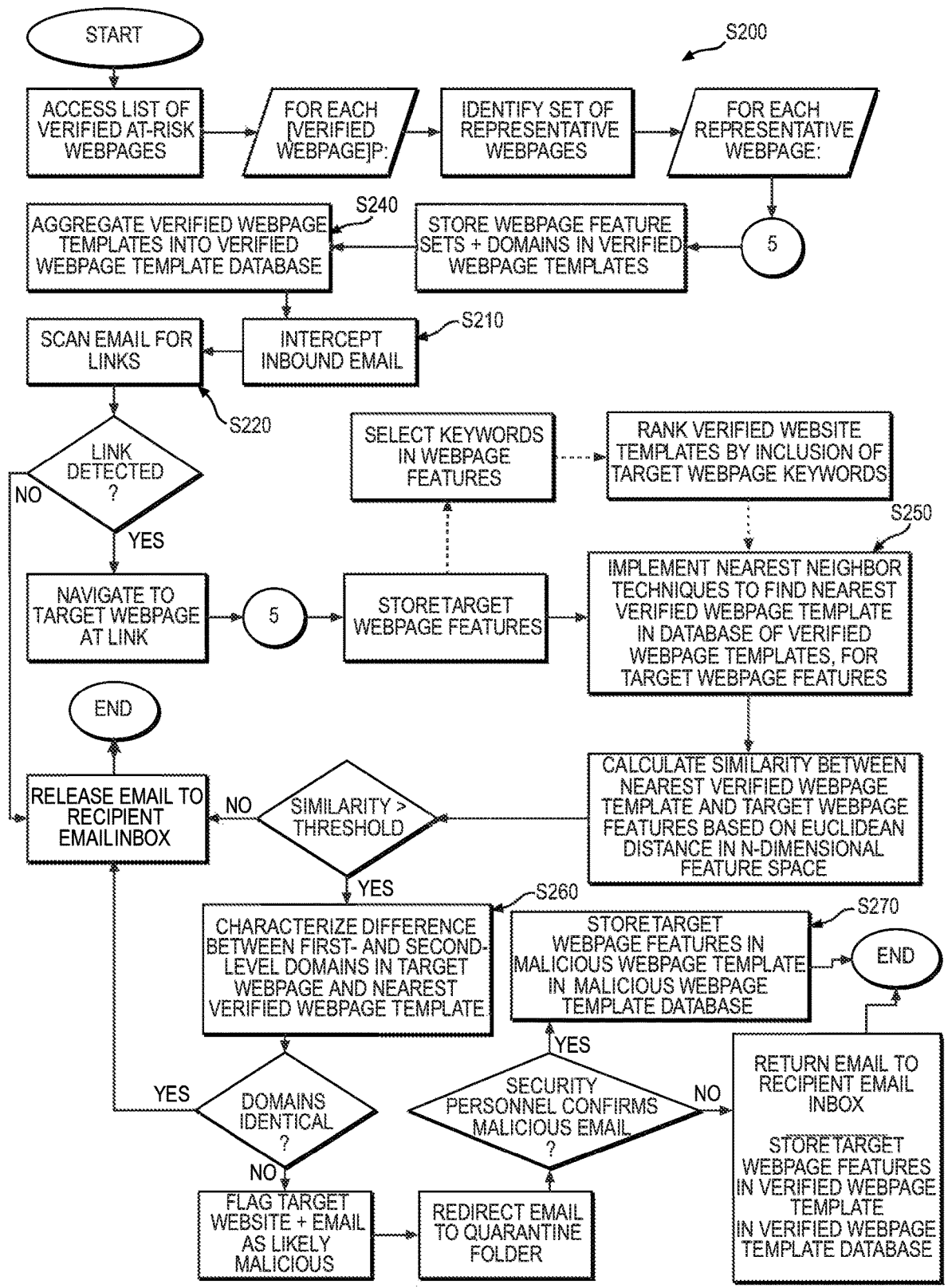
FIG. 3 is a flowchart representation of a second method.
Figure 5:
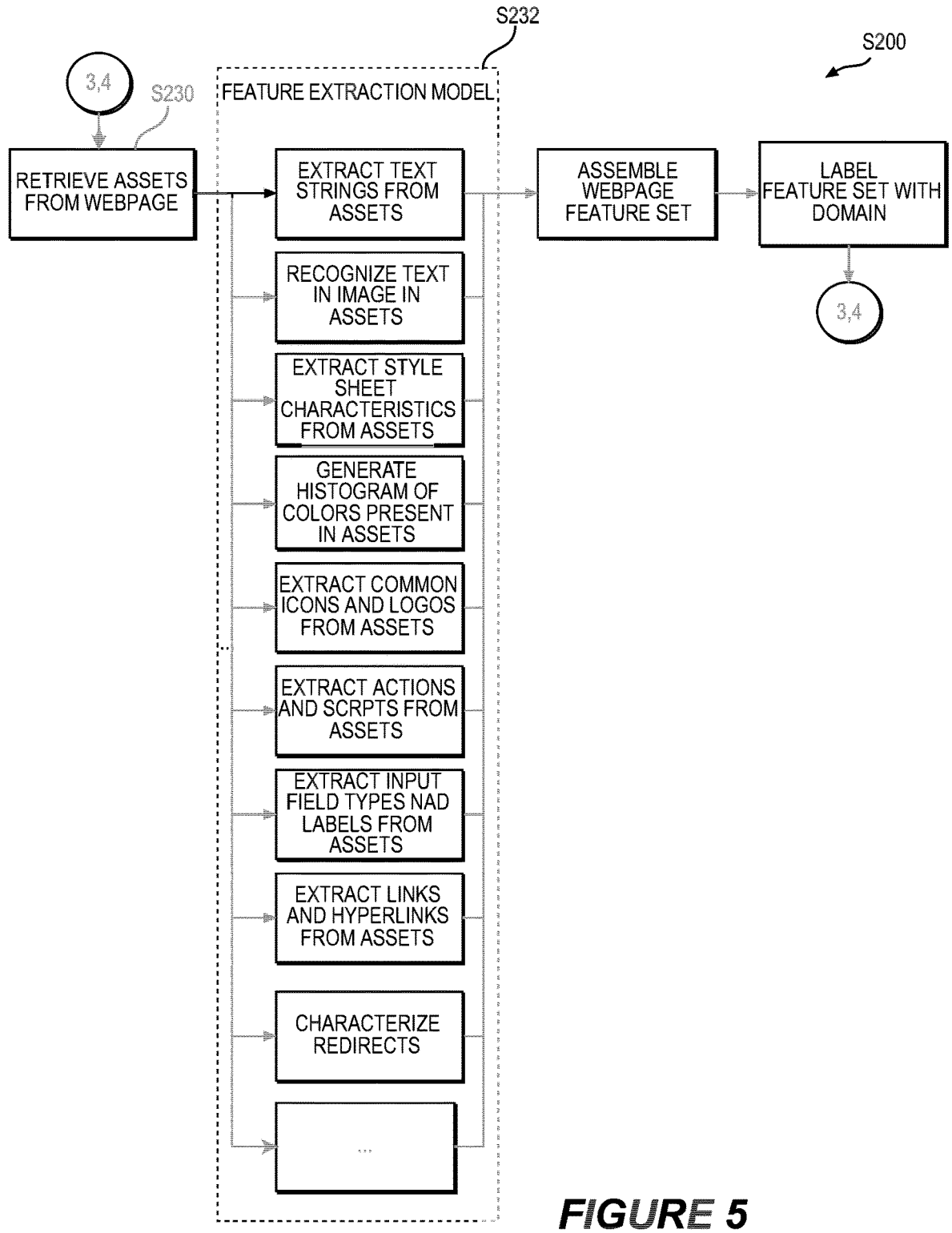
FIG. 5 is a flowchart representation of one variation of the second method.

As shown in FIGS. 3 and 5, a second method S200 for detecting spoofed webpages includes: accessing an inbound email (or stored email, outbound email) in Block S210; and scanning the inbound email for links in Block S220. The second method S200 also includes, in response to detecting a link in the inbound email: accessing a target set of web content contained in a target webpage at the link in Block S230; extracting a target set of visual features from the set of web content in Block S232; accessing a set of verified webpage templates, each verified webpage template in the set of verified webpage templates containing a set of verified features present in a verified webpage associated with a verified resource locator in Block S240; identifying a particular verified webpage template, in the set of verified webpage templates, containing a particular set of verified features approximating the target set of visual features in Block S250; and characterizing a difference between the link and a particular verified resource locator associated with the particular verified webpage template in Block S260. The second method S200 further includes, in response to the difference exceeding a threshold difference, flagging the email as malicious in Block S270.

Figure 4:
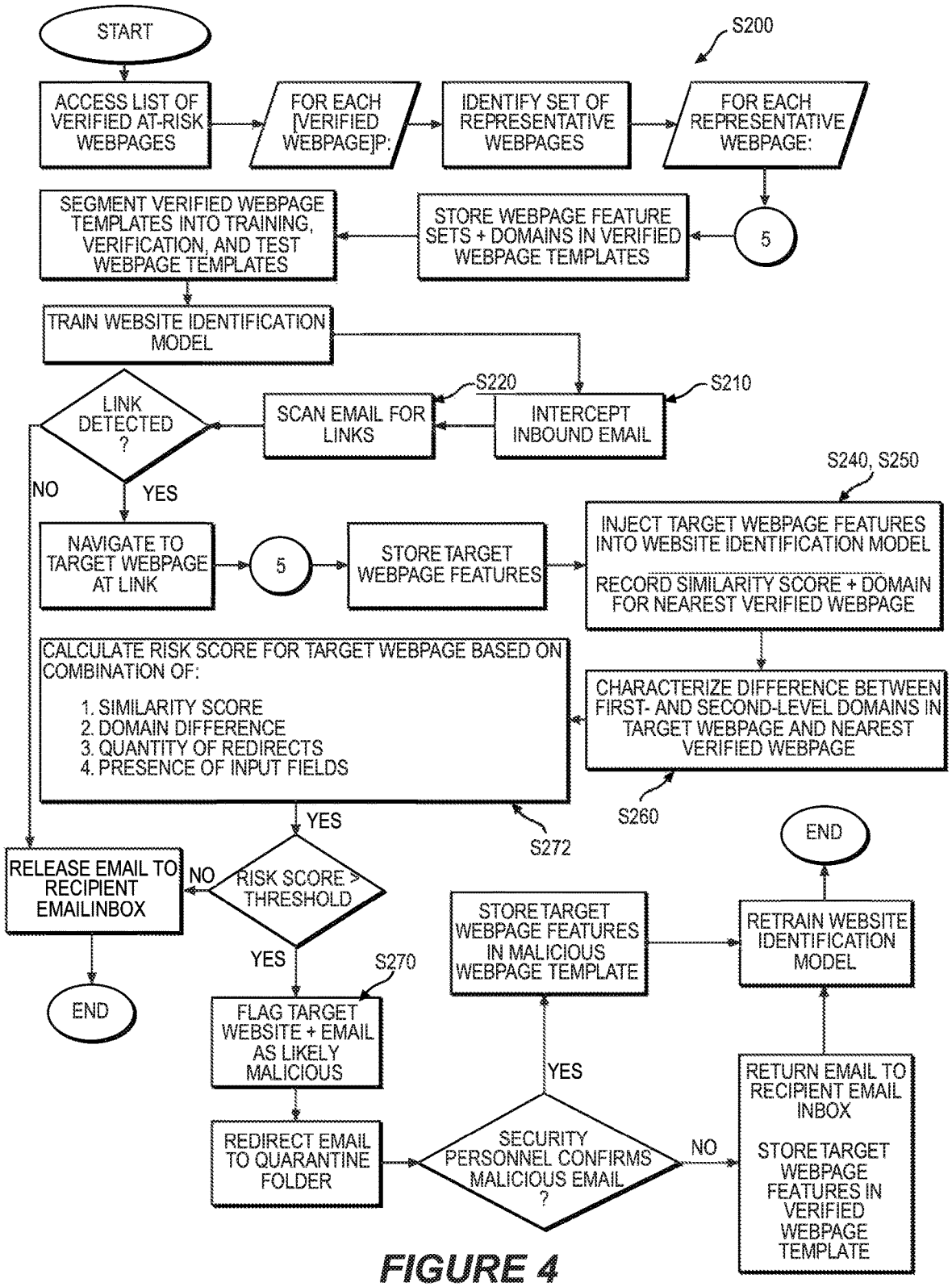
FIG. 4 is a flowchart representation of one variation of the second method.

One variation of the second method S200 shown in FIGS. 4 and 5 includes: accessing an email in Block S210; and scanning the email for links in Block S220. This variation of the second method S200 also includes, in response to detecting a link in the email: accessing a target set of web content contained in a target webpage at the link in Block S230; extracting a target set of visual features from the set of web content in Block S232; accessing a set of verified webpage templates, each verified webpage template in the set of verified webpage templates containing a set of verified features present in a verified webpage associated with a verified resource locator in Block S240; identifying a particular verified webpage template, in the set of verified webpage templates, containing a particular set of verified features approximating the target set of visual features in Block S250; and characterizing a difference between the link and a particular verified resource locator associated with the particular verified webpage template in Block S260. This variation of the method also includes: calculating a risk score for the email based on the difference in Block S272; and, in response to the risk score exceeding a threshold risk score, flagging the email as malicious in Block S270.

2.1 Applications

Like the first method described above, the second method S200 can be executed by a computer system (e.g., an incoming mail server, a security server, a computer network): to automatically detect a malicious link in an email— such as a link to a spoofed webpage to gain access to personal information (e.g., banking information) and credentials (e.g., usernames and passwords)—by comparing visual features in the linked webpage to visual features of known, verified webpages; and to selectively flag the email if the linked webpage contains visual features that match a particular verified webpage template, but is located at a domain that differs from the domain of the particular verified webpage template.

More specifically, the computer system can identify a target webpage that contains visual features (e.g., texts, colors, icons, images, input fields) that are identical to or that closely imitate a known, verified webpage template to the extent that a user viewing the target webpage may perceive the target webpage as authentic and affiliated with the verified webpage. The computer system then: compares the domains of the target webpage and the verified webpage; verifies and releases the email to its recipient if these domains match; and flags the target webpage as a spoofing webpage and flags the email as malicious if these domains differ. The computer system can then redirect a malicious email to a quarantine folder and/or delete the email from the recipient's email inbox.

In one example, the computer system executes Blocks of the second method S200: to access an email inbound to an organization (e.g., a computer network or email domain operated by the organization); to detect a link to a target webpage in the email; to retrieve visual features (e.g., text, colors, images, iconography, input fields, graphical elements) and nonvisual features (e.g., links, hyperlinks, scripts, actions) from this target webpage; and to scan a database of verified webpage templates that represent verified (e.g., authentic, authorized) websites for features that are analogous to (e.g., "match") the "target features" of the target webpage. In response to identifying a particular verified webpage template that best matches the target webpage, the computer system compares domains (e.g., top-level and second-level domains) of the particular verified webpage template and the target webpage. If these domains are identical, the computer system: confirms that the target webpage and a verified webpage represented by the particular verified webpage template are the same webpage; identifies the target webpage, the link, and the email as benign; and releases the email to its designated recipient. Conversely, if these domains are dissimilar, the computer system: identifies the target webpage as a spoofed version of a verified webpage represented by the particular verified webpage template; identifies the target webpage, the link, and the email as malicious; and redirects the email to a quarantine folder in the email inbox of its designated recipient and/or to a quarantine folder accessible by security personnel or an email administrator.

In another example, the computer system implements artificial intelligence techniques to train and manage a website identification model configured to match target webpages to verified webpages based on visual features extracted from target webpages. Accordingly, in this example, the computer system: passes target features extracted from the target webpage into the website identification model to identify a verified webpage nearest the target webpage; compares domains of the target webpage and the nearest verified webpage; and selectively handles the email accordingly, as described above.

Therefore, the computer system can execute Blocks of the second method S200 to automatically detect a malicious link in an email and to prevent or limit delivery of the email to a designated recipient based on visual features contained in a webpage (or web content) at the malicious link.

The second method S200 is described herein as executed by the computer system to detect and handle (e.g., redirect, delete, quarantine) emails containing links to malicious webpages. However, the computer system can additionally or alternatively execute Blocks of the second method S200 to detect and handle text messages, instant messages, and/or other communications containing links to malicious webpages. Furthermore, the second method S200 is described herein as executed by the computer system to monitor emails inbound to a particular email domain of one organization for links to malicious webpages. However, the computer system can execute Blocks of the second method S200 across multiple email domains, multiple organizations, etc.

Furthermore, the method S200 is described herein to access and process inbound emails. However, the computer system can additionally or alternatively executed Blocks of the method S200 to access and process outbound emails and/or emails stored in an inbox or other email folder.

2.2 Verified Webpage Templates

Generally, the computer system can generate a database of verified webpage templates—representing visual features of webpages within verified, authentic websites—for later comparison to target webpages linked in emails inbound to an organization.

2.2.1 At-Risk Webpages and Websites

In one implementation shown in FIGS. 3 and 5, the computer system accesses or generates a list of at-risk websites and webpages, such as websites and webpages: that exhibit greatest traffic by international users or users within a particular organization; that exhibit greatest frequency of malicious replication on spoofed webpages; and/or that contain login and other input fields that collect personal information and user credentials. For example, this list of at-risk websites and webpages can be manually-populated by an administrator of the organization, such as during a setup period and over time as the administrator identifies new email spoofing threats inbound to the organization over time. Additionally or alternatively, the computer system can retrieve this list of at-risk websites and webpages from published threat intelligence, such as both during a setup period and as additional threat intelligence is published over time. Furthermore, the computer system can additionally or alternatively: access a record of internet traffic with an organization; identify webpages and websites trafficked at greatest frequency and that collect personal information and/or user credentials; and then populate the list of at-risk websites and webpages with these webpages and websites.

2.2.2 Verified Webpage Template Generation

Then, for each website on this list, the computer system can autonomously: identify home webpages, login webpages, and/or other high-traffic webpages within the website; implement a feature extraction model to extract one set of features from each of these webpages; and generate a verified webpage template for each of these webpages based on the corresponding sets of features.

In one implementation, the computer system virtually navigates to a login webpage or otherwise retrieves assets contained in the login webpage of a first website on the list of at-risk websites and webpages. The computer system then implements a feature extraction model to extract visual and nonvisual features present on this webpage, such as including: text strings (e.g., alphanumeric characters) from text content; text strings from images (via optical character recognition); a list of or histogram representing shapes, geometries, and colors of backgrounds, texts, input fields, and page regions on the website; a list of recognized elements (e.g., faces, vehicles, computing devices identified via computer vision object recognition); presence or frequency of input fields; input field text labels (e.g., "username," "password"); actions (e.g., element animations, responsive elements, and scripts); and/or hyperlinks and links within the webpage.

In one example, the computer system then compiles these features into a verified webpage template that includes: a 2D image of the webpage; a text file containing all text strings extracted from text content and images on the webpage; an actions file describing action types and triggers for these actions present within the webpage; a links file containing links and hyperlinks within the webpage; an input file describing types of input fields present on the webpage and corresponding (e.g., nearest) text descriptions; and/or a histogram file describing frequencies of colors present on the webpage.

In another example, the computer system compiles these features into a verified webpage template that includes an n-dimensional vector representing these visual and non-visual features extracted from the webpage.

The computer system then labels the verified webpage template with a Uniform Resource Locator (or "URL") of the webpage and/or with components of the URL of the webpage, such as including a top-level domain, a second-level domain, a subdomain, a scheme, and/or a subdirectory of the webpage.

The computer system then repeats this process for login webpages of each other website and webpage in the list and stores the verified webpage templates in a verified webpage template database.

2.2.3 Webpage Archive

In one variation, the computer system: also accesses earlier instances of websites and webpages on the list of at-risk websites and webpages via an Internet archive; and implements the foregoing methods and techniques to generate a verified webpage template for both current and earlier instances of these websites and webpages.

In one implementation, for a first at-risk website in the list of websites and webpages, the computer system: retrieves multiple instances of a login webpage published within the at-risk website from an Internet archive; implements methods and techniques described above to extract visual and non-visual features from each instance of the login webpage; and calculates an intersection of these features. The computer system then compiles features in this intersection into a verified webpage template, such as including: a text file containing all text strings extracted from text content and images present across these instances of the webpage; an actions file describing action types and triggers for these actions present across these instances of the webpage; a links file containing links and hyperlinks present across these instances of the webpage; an input file describing types of input fields and corresponding (e.g., nearest) text descriptions present across these instances of the webpage; and a histogram file describing combined (e.g., average) frequencies of colors present across these instances of the webpage. The computer system then: labels the verified webpage template with the URL and/or components of the URL of the webpage; repeats this process for each other website and webpage in the list; and stores these verified webpage templates in a verified webpage template database.

In a similar implementation, for a first at-risk website in the list of websites and webpages, the computer system: retrieves multiple instances of a login webpage published within the at-risk website from an Internet archive; implements methods and techniques described above to extract visual and non-visual features from each instance of the login webpage; calculates an intersection of these features; stores a first set of features in this intersection as highest-weight features in a verified webpage template for this website; stores the remaining features in the current instance of the webpage only as lower-weight features in the verified webpage template; and labels the verified webpage template with the URL and/or with components of the URL of the webpage. The computer system then repeats this process for other webpages in the list and stores these verified webpage templates in a verified webpage template database.

2.2.4 Multiple Representative Webpages per Website

In another variation, for a first at-risk website in the list, the computer system: accesses a set of webpages within the website, such as including a homepage, a "contact" page, an "about" page, and a login webpage within the website; implements methods and techniques described above to extract visual and non-visual features from each webpage within the website; and calculates an intersection of these features. The computer system then compiles features in this intersection into a verified webpage template, such as including: a text file containing all text strings extracted from text content and images present across these instances of the webpage; an actions file describing action types and triggers for these actions present across these instances of the webpage; a links file containing links and hyperlinks present across these instances of the webpage; an input file describing types of input fields and corresponding (e.g., nearest) text descriptions present across these instances of the webpage; and/or a histogram file describing combined (e.g., average) frequencies of colors present across these instances of the webpage.

The computer system then: labels the verified webpage template with the URL and/or with components of the URL of the website; and repeats this process for each other webpage in the list.

Alternatively, the computer system can: store a first set of features in this intersection as highest-weight features in the verified webpage template for this website; store remaining features in a login webpage of the website as lower-weight features in the verified webpage template for this website; compile a verified webpage template for the website accordingly; label the verified webpage template with URL components of the website and/or webpages contained therein; store the verified webpage template in a verified webpage template database; and then repeat this process for other websites on the list.

However, the computer system can implement any other method or technique to generate verified webpage templates of at-risk websites and webpages.

2.2.5 Artificial Intelligence

In another variation shown in FIGS. 4 and 5, the computer system implements artificial intelligence techniques to develop a website identification model configured to predict a domain of a webpage based on visual and non-visual features of the webpage.

In one implementation, for a first at-risk website in the list, the computer system accesses a set of webpages within the website, such as including a homepage, a "contact" page, an "about" page, and a login webpage within the website.

For each of these representative webpages, the computer system implements methods and techniques described above: to extract features from the webpage; to compile these features into a verified webpage template; and to label the verified webpage template with components of the URL of the webpage. More specifically, the computer system can generate a corpus of verified webpage templates representing webpages published across the set of at-risk websites on the list.

The computer system then divides this corpus of verified webpage templates into training, validation, and/or test groups of verified webpage templates. Accordingly, the computer system implements artificial intelligence, machine learning, regression, and/or other techniques to train a website identification model—on the training group of verified webpage templates—to detect a domain (e.g., a second-level domain, a subdomain, and/or a directory) of a webpage based on features detected in the webpage (or extracted from assets linked to the webpage). Furthermore, the computer system implements artificial intelligence, machine learning, regression, and/or other techniques to: validate the website identification model based on the validation group of website templates; and evaluate the website identification model based on the test group of website templates.

In this implementation, the computer system can also: modify the feature extraction model to extract different combinations of features and feature types from these webpages; repeat the foregoing process to train and evaluate additional website identification models based on different combinations of feature types extracted from these webpages; and select and store a particular website identification model—and corresponding feature extraction model—that yields most efficient or accurate website identification in this set of website identification models.

However, the computer system can implement any other method or technique to generate and refine a website identification model.

2.2.6 Updates

The computer system can also update verified webpage templates in the database and/or update the website identification model over time, such as daily, in response to a manual prompt to add a new website, in response to a manual prompt to update the database or website identification model, or in response to another trigger event.

For example, in response to a trigger event, the computer system can: access a first webpage in the list of high-risk webpages; implement the feature extraction model to extract a new set of features from the first webpage; and compare these features to the last set of stored features for the first webpage (e.g., in the corresponding verified webpage template). In this example, if these new and last sets of features of the webpage differ, the computer system can implement the foregoing methods and techniques: to generate a new (i.e., replacement) verified webpage template for the first website; to update a verified webpage template for the website; or to retrain the website identification model based on these new features.

Additionally or alternatively, the computer system can repeat the foregoing methods and techniques to generate verified webpage templates for additional websites and/or to retrain the website identification model to further identify additional websites, such as: in response to published threat intelligence indicating a new high-risk website; and/or in response to a manual prompt to add a new website.

Additionally or alternatively, the computer system can repeat the foregoing methods and techniques to update a verified webpage template (e.g., by reinforcing feature types and feature weights contained in the verified webpage template) for a website already represented in the verified webpage template database for each instance that the verified webpage is opened from a link in an inbound email by a user within the organization.

However, the computer system can update the verified webpage template database and/or the website identification model in any other way and in response to any other trigger event.

2.2.7 Malicious Webpages and Malicious Webpage Templates

In one variation, the computer system implements similar methods and techniques to access a list of malicious websites and/or webpages, such as: detected automatically by the computer system over time according to Blocks of the second method S200; manually identified by security personnel; or published by threat intelligence. In this variation, the computer system: navigates to a malicious webpage; extracts features from the malicious webpage; generates a malicious webpage template containing these features; labels this malicious webpage template with URL components of the malicious webpage; stores this malicious webpage template in a database of malicious webpage templates; and repeats this process for other malicious webpages in the list.

Additionally or alternatively, the computer system can implement methods and techniques described above to: generate and store verified webpage templates; generate and store malicious webpage templates; and train the webpage identification model on these verified and malicious webpage templates to detect and distinguish between malicious and verified websites and webpages based on input visual and/or non-visual features.

2.3 Email Ingest

Block S210 of the second method S200 recites accessing (or accessing) an inbound email. Generally, in Block S210, the computer system accesses an email inbound from a sender to a recipient within an email domain, computer network, or organization more generally. For example, the computer system can access the email at a SMTP or IMAP server before the email is delivered to the designated recipient. Alternatively, the computer system can access the email by interception or introspection via an API integration with an email exchange.

The computer system can also access both emails inbound from outside of the domain or computer network and emails routed inside of the domain or computer network.

2.4 Link Detection

Block S220 of the second method S200 recites scanning the inbound email for links. Generally, in Block S220, the computer system can: scan (or "parse," process) the email for links (e.g., a web addresses, an Internet links, hyperlinks), such as both visible links and links anchored to text in the email; and extract these links from the email.

In response to detecting a set of links in the email, the computer system executes subsequent Blocks of the second method S200 for each link in the email.

2.5 Target Website Access

Block S230 of the second method S200 recites, in response to detecting a link in the inbound email, accessing a target set of web content contained in a target webpage at the link.

In one implementation, the computer system automatically loads the target webpage at the link in a virtual machine in Block S230 and then extracts features (e.g., text content and images) from the webpage rendered within the virtual machine in Block S232.

In another implementation, the computer system retrieves assets linked to the website, such as an HTML database of images, text, scripts, style sheets, etc. in Block S230.

However, the computer system can access web content contained in or defining the target webpage in any other way in Block S230.

2.6 Target Webpage Features

Block S232 of the second method S200 recites extracting a target set of visual features from the set of web content, as shown in FIG. 5.

In particular, the computer system can implement the feature extraction model—described above to generate verified webpage templates and the website identification model based on verified webpages—to detect and extract similar features from the target webpage in Block S232. For example, the computer system can: access text content contained in the target webpage and images contained in the target webpage; extract a first subset of alphanumeric characters from text content contained in the target webpage; recognize a second subset of alphanumeric characters in images contained in the target webpage; and aggregate the first subset of alphanumeric characters and the second subset of alphanumeric characters into the set of alphanumeric characters in Block S232.

In a similar example, the computer system can: access a corpus of text content and images contained in the target webpage; and implement the feature extraction model to extract a target set of alphanumeric characters and a target set of image features from text content and images contained in the target webpage.

However, the computer system can implement any other method or technique to extract visual and/or non-visual features of any other type or format from the target webpage.

2.7 Target Webpage Matching

Block S240 of the second method S200 recites accessing a set of verified webpage templates, each verified webpage template in the set of verified webpage templates containing a set of verified features present in a verified webpage associated with a verified resource locator; and Block S250 of the second method S200 recites identifying a particular verified webpage template, in the set of verified webpage templates, containing a particular set of verified features approximating the target set of visual features.

2.7.1 Nearest Webpage Templates

In one implementation shown in FIG. 3, in Blocks S240 and S250, the computer system can: identify a verified webpage template—in the verified webpage template database—containing a constellation of visual and non-visual features nearest (e.g., best-approximating, exhibiting least error) the visual and non-visual features of the target webpage. If a similarity between this nearest verified webpage template and the target webpage exceeds a threshold similarity, the computer system can identify the verified webpage template and the target webpage as corresponding to the same webpage or website.

In one example, the computer system extracts a target set of alphanumeric characters and a target set of image features from text content and images contained in the target webpage in Block S232. Then, for each verified webpage template in the set of verified webpage templates, the computer system calculates a similarity score for the verified webpage template based on proximity of verified features represented in the verified webpage template to the target set of alphanumeric characters and the target set of image features. Accordingly, the computer system: identifies a particular verified webpage template corresponding to a highest similarity score in the set of verified webpage templates; and matches the particular verified webpage template to the target webpage in response to a particular similarity score of the particular verified webpage template exceeding a threshold score.

Therefore, in this implementation, the computer system can implement template matching techniques: to identify a verified webpage template that is nearest (e.g., "nearest to matching") the target webpage; and to calculate a similarity score between the nearest verified webpage template and the target webpage. The computer system can then identify the verified webpage template and the target webpage as a match if this similarity score exceeds a threshold score.

2.7.1.2 Verified Webpage Template Selection by Keyword

In one variation shown in FIG. 3, the computer system selectively compares the target webpage to verified webpage templates based on similarity of features of the target webpage and verified webpage templates.

In one implementation, the computer system: accesses a set of keywords, wherein each keyword in this set is present on a verified webpage represented in the verified webpage template database; and scans a set of words (e.g., text strings) extracted from the target webpage for an intersection with the set of keywords. The computer system then: selects a subset of verified webpage templates containing keywords in the intersection; implements methods and techniques described above to selectively scan the subset of verified webpage templates for verified webpage templates representing verified features that approximate the target set of visual features extracted from the target webpage; and identifies a particular verified webpage template—in the subset of verified webpage templates—that contains the particular set of verified features nearest the target set of visual features.

However, if the computer system fails to identify keywords of verified webpage templates in the target webpage, the computer system can revert to scanning the entire verified webpage template database for a matching verified webpage template. In particular, the computer system can: extract a set of words from text content and/or images contained in the target webpage; and scan the set of words for an intersection with the set of keywords present in the verified webpage template database. Then, in response to this intersection containing a null set, the computer system can: selectively scan the set of verified webpage templates for verified webpage templates representing verified features approximating the target set of visual features extracted from the target webpage; identify a verified webpage template—in the database of verified webpage templates—containing a set of verified features nearest the target set of visual features; and characterize a feature difference between the set of verified features and the target set of visual features. Then, in response to the feature difference exceeding a threshold feature difference, the computer system can: predict that the target webpage is not a spoofing attempt of a high-risk website or webpage; and release the email to its designated recipient accordingly.

Additionally or alternatively, the computer system can similarly rank or prioritize comparison of the target webpage to verified webpage templates in the database based on other feature types, such as based on verified webpage templates that contain the same or similar color histograms (e.g., the same or similar three high-frequency colors) as the target webpage.

2.7.2 Nearest Verified Vector

In another implementation shown in FIG. 3, the computer system: extracts a target set of alphanumeric characters, a target set of icons, and a target set of colors from the target webpage; and identifies the particular verified webpage template—from the set of verified website templates—that represents alphanumeric characters, icons, and colors nearest (e.g., with least aggregate error from) the target set of alphanumeric characters, the target set of icons, and the target set of colors in the target set of visual features of the target webpage.

In the foregoing examples, the computer system can access, generate, and/or maintain a database of verified webpage templates, wherein each verified webpage template in the database includes a "verified vector" containing values representing alphanumeric characters, icons, colors, and/or other visual and non-visual features of a verified webpage associated with a verified URL (or other resource locator). Accordingly, the computer system can store the target set of alphanumeric characters, the target set of icons, the target set of colors, and other features extracted from the target webpage in a "target vector." The computer system can then identify a particular verified vector—representing a particular verified webpage—nearest (i.e., exhibiting a least error or shortest Euclidean distance from) the target vector in a multi-dimensional feature space. Accordingly, the computer system can: characterize a distance (e.g., a Euclidean distance) between the particular verified vector and the target vector in the multi-dimensional feature space; and match the particular verified webpage—represented by the particular verified vector—to the target webpage in response to this distance falling below a threshold distance.

In a similar implementation in which the computer system represents multiple instances of a webpage and/or multiple pages within a website in the verified webpage template database, the computer system can: store these verified webpage templates as verified vectors; implement clustering (e.g., K-means clustering) techniques to identify a particular cluster of verified vectors associated with the same domain and nearest the target vector; calculate an error (e.g., a combination of Euclidean distances) between the target vector and verified vectors in this particular cluster; and match a particular verified webpage—represented by verified vectors in this cluster—to the target webpage in response to this error falling below a threshold error.

2.8 Domain Check+Malicious Email Detection

The computer system can then identify the target webpage as malicious (or suspicious)—and the email as similarly malicious (or suspicious)—if the target webpage matches a verified webpage but is located at a different domain than the verified webpage. More specifically, if the target webpage and the verified webpage are visually very similar or identical, a user may confuse the target webpage for the verified webpage. If the domain of the target webpage differs from the verified webpage, the target webpage is unlikely to be hosted by or affiliated with the same organization as the verified webpage and is therefore likely a spoofed webpage. Accordingly, the computer system can flag and redirect the email in order to reduce the recipient's exposure to financial or data loss via the spoofed website.

In particular, after identifying a verified webpage template nearest the target webpage in Block S250, the computer system can: extract a target domain from the link in the email (or extract a target domain of a final static webpage opened following a sequence of webpage redirects when the link in the email is opened); extract a particular domain from a URL of the nearest verified webpage template; and characterize a difference between the target domain and the particular domain.

For example, the computer system can execute character by character comparison of the top- and second-level domains of the target webpage and the top- and second-level domains of the nearest verified webpage templates. If the these top- and second-level domains are very similar but not exact matches—such as different by a single character—the computer system can: predict deceptive intent of the target webpage to spoof the verified webpage; flag the target webpage as malicious (or suspicious) if these top- and second-level domains are not exact matches; and thus flag the email as malicious (or suspicious) accordingly. More specifically, a spoofed webpage may be located at a domain very similar to the corresponding verified webpage but with subtle character changes that may deceive a user into perceiving the spoofed webpage as authentic. Therefore, very similar—but different—domains of the matched target webpage and verified webpage template may indicate an intent to deceive and a high-risk spoofed webpage.

Therefore, the computer system can flag the email as malicious in response to the target domain of the target webpage differing from the particular domain of the nearest verified webpage template.

Conversely, the computer system can: identify the target webpage and verify and identify the email as benign if the top- and second-level domains of the target webpage and the top- and second-level domains of the nearest verified webpage template are identical; and release the email to the email inbox of a designated recipient accordingly.

2.9 Website Identification Model+Risk Score

In one variation shown in FIG. 4, the computer system can inject features of the target webpage into the website identification model, which returns an identifier (e.g., a URL) of a nearest verified webpage template and a similarity score for the particular verified webpage template and the target webpage (or confidence score that the particular verified webpage template matches the target webpage).

In particular, the computer system can implement the feature identification model to both: extract features from verified webpages for construction of the website identification model; and extract features from the target webpage for identification of a nearest verified webpage template by the website identification model. Accordingly, the computer system can: implement the feature identification model to extract a set of visual and/or non-visual features from the target webpage; aggregate these features (e.g., into a vector); and insert these features into the website identification model, which outputs an identifier (e.g., a URL) for a nearest verified webpage and a similarity score of the nearest verified webpage and the target webpage.

2.9.1 Risk Score

As described above, the computer system can then: characterize a difference between the domain of the target webpage and the domain of the nearest verified webpage, as described above; and calculate a risk score for the link and the email based on a combination (e.g., weighted sum) of the similarity score and the difference between the domains of the target webpage and the verified webpage.

In one variation, the computer system also retrieves characteristics of the target webpage, such as: quantity of redirects between the link in the email and the target webpage; presence of input fields (labeled with "username," "email address," "password," or "passcode") on the target webpage; absence of a secure URL at the target webpage; and/or deviation from current webpage best practices (e.g., input fields buried behind images, text-heavy images in place of text and style sheets). The computer system then calculates the risk score for the link and the email further based on these characteristics of the target webpage, as shown in FIG. 3.

For example, the website identification model can return a high similarity score for the target webpage and a nearest verified webpage if the target webpage and the nearest verified webpage contain very similar text, keywords, style sheets, images, icons, background and text colors, etc. Furthermore, the computer system can execute character by character comparison of the top- and second-level domains of the target webpage and the top- and second-level domains of the nearest verified webpage templates. If these top- and second-level domains are very similar but not exact matches—such as different by a single character—the computer system can: predict deceptive intent of the target webpage to spoof the verified webpage; and calculate a high domain score for the target webpage. More specifically, a spoofed webpage may be located at a domain very similar to the corresponding verified webpage, but with subtle character changes that may deceive a user into perceiving the spoofed webpage as authentic. Therefore, very similar— but different—domains of the matched target webpage and verified webpage template may indicate an intent to deceive and a high-risk spoofed webpage, and the computer system can calculate a high domain score for the target webpage accordingly. (The computer system can similarly calculate a lesser domain score for target webpages at domains exhibiting greater differences from the domains of their nearest verified webpages.)

In this example, the computer system can also: calculate a redirect score proportional to a quantity of redirects between the link in the email and the target webpage; calculate a credential loss score based on (e.g., proportional to) presence of input fields (labeled with "username," "email address," "password," or "passcode") on the target webpage; calculate a security score based on absence of a secure URL at the target webpage; and/or calculate a practice deviation score based on (e.g., proportional to) characteristics of the target webpage that deviate from current webpage best practices; etc. The computer system can then compile the similarity score, the domain score, the redirect score, the credential loss score, the security score, and/or the practice deviation score into a risk score for the target webpage and the email, such as by calculating a linear combination (e.g., a weighted sum) of these scores.

Then, if the risk score for the target webpage and the email exceeds a threshold risk score, the computer system can flag the target webpage and the email as malicious.

Conversely, if the risk score falls below the threshold risk score and/or if the similarity of the target webpage to the nearest verified webpage falls below a threshold similarity score, the computer system can: identify the second inbound email as benign; and release the second inbound email to an email inbox in an email account associated with a recipient address specified in the inbound email.

2.10 Credential Input

In one variation, the computer system can additionally or alternatively detect an input field (e.g., a credential input field) in the target webpage and predict a risk of financial or data loss at the page based on presence of the input field.

In one implementation, if the computer system fails to match the target webpage to a verified webpage template or if the website identification model returns a low similarity score for a nearest verified webpage, the computer system can scan the target webpage (or assets linked to the target webpage) for a credential input field, such as labeled with "username," "email address," or "password." Then, in response to detecting a credential input field in the target webpage, the computer system can: flag the target webpage as suspicious; label the link in the email as suspicious; and release the email—with the link thus labeled—to its recipient. If the recipient then confirms that the target webpage is benign (e.g., by selecting a "benign" input field inserted into the email by the computer system), the computer system can generate a verified webpage template for the target webpage and/or update the website identification model to reflect the target webpage as benign. Conversely, if the recipient confirms that the target webpage is malicious (e.g., by selecting a "malicious" input field inserted into the email by the computer system), the computer system can generate a malicious webpage template for the target webpage and/or update the website identification model to reflect the target webpage as malicious.

Additionally or alternatively, in response to detecting absence of a credential input field in the target webpage, the computer system can: scan the target webpage for links and hyperlinks; access additional, secondary webpages connected to these links and hyperlinks; repeat the foregoing methods and techniques to identify benign, malicious, and/or suspicious webpages linked to the target webpage; selectively flag these secondary webpages and the target webpage; and selectively handle or label the email accordingly.

For example, the computer system can execute the foregoing methods and techniques to automatically: release an email containing a link to a webpage that contains no credential input field, but that includes links to verified social media websites that contain credential input (i.e., login) fields; flag as suspicious an email that contains a link to a webpage that contains a credential input field, but that is not represented in the database verified webpage template or in the website identification model; flag as suspicious an email that contains a link to a webpage that contains no credential input field, but that is linked (e.g., redirected over multiple hops) to another webpage that does contain a credential input field and that is not represented in the database verified webpage template or in the website identification model; and/or flag as malicious an email that contains a link to a webpage that matches a malicious webpage template or that contains a link to another webpage that matches a malicious webpage template.

In a similar implementation, the computer system can scan web content of the target webpage for credential input fields and broken links. For each verified webpage template in the set of verified webpage templates, the computer system can then calculate a similarity score for the verified webpage template based on proximity of verified features represented in the verified webpage template to the target set of alphanumeric characters and the target set of image features. The computer system can then identify a particular (e.g., nearest) verified webpage template corresponding to a highest similarity score of verified webpage templates in the database. In this example, the computer system can further calculate a risk score for the email based on: a particular similarity score of the particular verified webpage template; a frequency of credential input fields contained in the target webpage; a frequency of broken links contained in the target webpage; and a difference between the domains of the particular verified webpage template and the target webpage.

In a similar implementation, the computer system can: scan web content in the target of the webpage for a set of hyperlinks; access web content contained in secondary webpages at the set of hyperlinks; and scan web content of the target and secondary webpages for credential input fields. For each verified webpage template in the set of verified webpage templates, the computer system can then calculate a similarity score for the verified webpage template based on proximity of verified features represented in the verified webpage template to the target features extracted from the target webpage. The computer system can then identify a particular verified webpage template that corresponds to a highest similarity score of verified webpage templates in the set of verified webpage templates. The computer system can then calculate a risk score for the email based on: a particular similarity score of the particular verified webpage template nearest the target webpage; a frequency of credential input fields contained in the target webpage; and a difference between the domains of the particular verified webpage template and the target webpage.

2.11 Email Handling: Malicious

Block S270 of the second method S200 recites, in response to the difference exceeding a threshold difference, flagging the email as malicious. Block S270 can similarly recite, in response to the risk score exceeding a threshold risk score, flagging the email as malicious.

In one implementation shown in FIGS. 3 and 4, in response to identifying the target webpage as malicious, the computer system: labels the inbound email as malicious; redirects the email from an email inbox in an email account associated with a recipient address specified in the inbound email to an administrator folder for administrator review; and prompts security personnel or an email administrator to investigate the email and the link contained therein. Then, if the security personnel or email administrator confirms the email, the link, and/or the webpage as malicious, the computer system can: delete or discard the email; prevent release of the email to the recipient; and update the database of malicious webpages and/or the website identification model to reflect the malicious webpage. Conversely, if the security personnel or email administrator confirms the email, the link, and/or the webpage as benign, the computer system can: release the email to the recipient; and update the database of verified webpages and/or the website identification model to reflect the benign webpage.

Additionally or alternatively, in response to identifying the target webpage as malicious, the computer system can: transfer the email from an email inbox to a quarantine folder in an email account associated with a recipient address specified in the inbound email; prompt the recipient to investigate the email and the link contained therein; and selectively update the verified webpage template database, the malicious webpage template database, and the website identification model based on feedback supplied by the recipient.

Additionally or alternatively, in response to identifying the target webpage as malicious, the computer system can: permanently delete the email from the recipient's email client; move the email to a deleted items folder in the recipient's email client; and/or insert a malicious email warning banner into the email to before releasing the email to its recipient.

2.11.1 Email Handling: Suspicious

In one variation, the computer system implements similar methods and techniques to handle an email containing a link labeled as suspicious.

For example, the computer system can redirect the email to both the quarantine folder of the email administrator and to the quarantine folder of the recipient designated by the email. In this example, if the administrator confirms that the email is malicious before the recipient opens the email, the computer system can: delete the email or otherwise remove the email from the recipient's quarantine folder; relabel the webpage as malicious; and update the database of malicious webpage templates and/or the website identification model accordingly. Alternatively, if the recipient confirms the email as malicious before security personnel opens the email, the computer system can: delete the email or otherwise remove the email from the recipient's quarantine folder; relabel the webpage as malicious; notify the email administrator or security personnel of the malicious email and malicious webpage; and update the database of verified webpage templates and/or the website identification model accordingly. However, if the administrator or the recipient confirm the email is benign, the computer system can: move the email to recipient's email inbox; relabel the webpage as benign; and update the database of verified webpage templates and/or the website identification model accordingly.

Additionally or alternatively, in response to identifying the target webpage as suspicious, the computer system can insert a suspicious email warning banner into the email to before releasing the email to its recipient.

2.12 Verified Webpage Template Database Expansion

In one variation shown in FIGS. 3 and 4, if security personnel or the recipient confirm that the email, the link in the email, and/or the corresponding target webpage is benign, and if the domain (e.g., the combined top-level and second-level domains) of the target webpage is not currently represented in the corpus of verified webpage templates, the computer system can implement methods and techniques described above to: generate a new webpage template for the target webpage; label the new webpage template with the corresponding domain; and append this new webpage template to the verified webpage template database.

Additionally or alternatively, if security personnel or the recipient confirm that the email, the link in the email, and/or the corresponding target webpage is benign, and if the domain of the target webpage is not currently represented in the website identification model, the computer system can implement methods and techniques described above to: generate a new webpage template for the target webpage; label the new webpage template as benign; label the new webpage template with the corresponding domain; and retrain the website identification model to identify the webpage as benign.

Later, the computer system can: automatically identify the same or similar webpage—linked in a later inbound email— as benign based on the updated verified webpage template database and/or the updated website identification model; and automatically release this later inbound email to its recipient accordingly.

2.12.1 Malicious Webpage Database Expansion

In a similar variation, if security personnel or the recipient confirm that the email, the link in the email, and/or the corresponding target webpage is malicious, and if the domain of the target webpage is not currently represented in the corpus of malicious webpage templates, the computer system can: generate a malicious webpage template for the target webpage; label the new webpage template with the corresponding domain; and append the webpage template to the malicious webpage database.

For example, in response to identifying the email and/or the link in the email as malicious, the computer system can: store a target set of visual features extracted from the target webpage in a spoofed webpage template; associate the spoofed webpage template with the link; and store the spoofed webpage template in a set of spoofed webpage templates, such as in the malicious webpage template database.

In this variation, the computer system can implement methods and techniques similar to those described above to: access an inbound email; and scan the inbound email for links. Then, in response to detecting a link in this inbound email, the computer system can: access a target set of web content contained in a target webpage at the link; extract a target set of visual features from this set of web content; compare this set of features to both malicious and verified webpage templates; and identify a particular spoofed webpage template—in the database of spoofed webpage templates—containing a particular set of spoofed features approximating the target set of visual features extracted from this email. Then, in response to identifying the particular spoofed webpage template that matches (or "approximates") the target webpage, the computer system can: compare the domains of the nearest malicious webpage template and the target webpage; and flag the second email as malicious if these domains are identical or similar.

The computer system can additionally or alternatively: train the website identification model based on features of target webpages labeled or identified as malicious; implement this website identification model to identify a malicious webpage visually-nearest a target webpage linked in an email and to calculate a similarity score between the nearest webpage and the target webpage; and then flag the target webpage—and the email—as malicious if this similarity score for the nearest malicious webpage template exceeds a threshold visual similarity and/or if a similarity between the domains of these webpages exceeds a threshold domain similarity.

2.13 Malicious Email Database

In one variation, the computer system implements similar methods and techniques: to generate a corpus of malicious communication templates that represent communications (e.g., emails, text communications, business communications) identified as invalid or malicious; to access an inbound communication; to extract target visual features from the inbound communication; to compare these target features to these malicious communication templates; and to identify the inbound communication as suspicious or malicious in response to identifying a similar or matching malicious communication template in this set.

For example, in response to identifying a link in an inbound email as malicious based on a first set of visual features extracted from a webpage at a link in the email, the computer system can: extract a second set of visual features from the inbound email; store the second set of visual features in a spoofed email template; and store the spoofed email template in a set of spoofed email templates. The computer system can then: access a second inbound email; extract a third set of visual features from the second inbound email; and identify a particular spoofed email template—in the set of spoofed email templates—containing a particular set of spoofed features approximating the third set of visual features. Then, in response to identifying the particular spoofed email template, the computer system can flag the second email as malicious and automatically quarantine or redirect the second email.

In a similar example, if security personnel or the recipient of the inbound confirm that the email, the link in the email, and/or the corresponding target webpage is malicious, the computer system can implement methods and techniques similar to these described above to: extract features from the malicious email, such as text strings, links, actions, images, and/or icons; compile these features into a malicious email template; label the malicious email template as malicious; and store the malicious email template in a malicious email database. Later, in response to accessing an inbound email, the computer system can: detect a link in the later inbound email; extract webpage features from a webpage at this link; and implement methods and techniques described above to scan the verified webpage template database for a verified webpage template that matches these webpage features. In this example, the computer system can concurrently implement similar methods and techniques to: extract features from the later inbound email; and implement methods and techniques described above to scan malicious email templates in the malicious email database for a malicious email template that matches these email features. The computer system can then: fuse results from these template comparisons; and selectively quarantine or release the email accordingly. For example, in response to identifying both the webpage and the email as benign, the computer system can label the email as benign, insert a "verified email" or "verified link" flag in the email, release the email to its recipient.

Similarly, in response to identifying the webpage as malicious (regardless of the state of the email), the computer system can label the email as malicious and redirect the email to security personnel.

However, in response to identifying the webpage as benign, but the email as malicious, the computer system can label the email as suspicious, redirect the email to the recipient's quarantine folder, and also flag the email for investigation by security personnel to confirm intent of the email and the linked webpage.

2.13.1 Communication Identification Model

In a similar variation, the computer system can train a communication identification model based on a corpus of past inbound communications (e.g., emails, text communications, business communications) previously identified as valid and malicious. The computer system can then implement methods and techniques described above: to access an inbound communication; to extract target visual features from the inbound communication; to inject these target features into the communication identification model to identify a nearest past inbound communication; and to identify the inbound communication as suspicious or malicious in response to the communication identification model returning a confidence score—in excess of a threshold confidence score—that the email is malicious.

For example, if security personnel or the recipient confirm that the email, the link in the email, and/or the corresponding target webpage is benign, the computer system can implement methods and techniques similar to those described above for a webpage to: extract features from the benign email, such as text strings, links, actions, images, and/or icons; compile these features into a benign email template; and label the benign email template as benign. Similarly, if security personnel or the recipient confirm that the email, the link in the email, and/or the corresponding target webpage is malicious, the computer system can implement methods and techniques similar to those described above for a webpage to: extract features from the malicious email, such as text strings, links, actions, images, and/or icons; compile these features into a malicious email template; and label the malicious email template as malicious. The computer system can repeat this process for other malicious and benign emails inbound to the organization and thus aggregate a corpus of inbound emails labeled as malicious and benign (and specifically containing links).

The computer system can then implement artificial intelligence, machine learning, regression, and/or methods and techniques described above to train an email identification model to detect and distinguish benign and malicious emails based on features (e.g., visual, text, and action features) extracted from these emails.

Accordingly, in response to accessing a later inbound email, the computer system can: detect a link in the later inbound email; extract webpage features from a webpage at this link; and insert these webpage features into the webpage identification model to calculate a confidence score that the webpage is malicious. The computer system can concurrently implement similar methods and techniques to: extract features from the later inbound email; and insert these email features into the email identification model to calculate a confidence score that the email is malicious. The computer system can then: calculate a composite confidence score based on a combination (e.g., an average) of these two confidence scores; and selectively quarantine or release the email if this composite confidence score exceeds a threshold score.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for detecting spoofed webpages comprising:
accessing a target set of web content contained in a target webpage;
extracting a target set of visual features from the target set of web content, the target set of visual features comprising a target set of alphanumeric characters;
accessing a set of verified webpage templates;
for each verified webpage template in the set of verified webpage templates:
calculating a similarity score for the verified webpage template based on proximity of verified features represented in the verified webpage template to the target set of visual features;
identifying a particular verified webpage template corresponding to the verified webpage template with the similarity score greater than similarity scores of other verified webpage templates in the set of verified webpage templates;
in response to a particular similarity score of the particular verified webpage template exceeding a threshold score, matching the particular verified webpage template to the target webpage;
characterizing a feature difference between the particular set of verified features and the target set of visual features; and
in response to the feature difference exceeding a threshold feature difference, flagging the target webpage as malicious.

2. The method of claim 1:
further comprising:
accessing an inbound email; and
scanning the inbound email for links;
wherein accessing the target set of web content comprises accessing the target set of web content contained in the target webpage at the link in the inbound email;
wherein extracting the target set of visual features comprises extracting a target set of image features; and
further comprising:
in response to detecting a link embedded in the inbound email, characterizing a difference between the link and a particular verified resource locator associated with the particular verified webpage template; and
in response to the difference exceeding a threshold difference, flagging the inbound email as malicious.

3. The method of claim 2:
wherein accessing the target set of web content contained in the target webpage comprises loading the target webpage at the link;
wherein extracting the target set of visual features from the target set of web content comprises extracting the target set of alphanumeric characters and the target set of image features comprising a target set of icons and a target set of colors from the target webpage;
wherein identifying the particular verified webpage template comprises identifying the particular verified webpage template, from the set of verified webpage templates, representing alphanumeric characters, icons, and colors nearest the target set of alphanumeric characters, the target set of icons, and the target set of colors in the target set of visual features;
wherein characterizing the difference between the link and the particular verified resource locator associated with the particular verified webpage template comprises:
extracting a target domain from the link;
extracting a particular domain from the particular verified resource locator; and
characterizing the difference between the target domain and the particular domain; and
wherein flagging the inbound email as malicious comprises flagging the inbound email as malicious in response to the target domain differing from the particular domain.

4. The method of claim 2, wherein flagging the inbound email as malicious comprises:
labeling the inbound email as malicious; and
transferring the inbound email from an email inbox to a quarantine folder in an email account associated with a recipient address specified in the inbound email.

5. The method of claim 2, further comprising:
in response to the difference exceeding the threshold difference:
storing the target set of visual features in a spoofed webpage template;

associating the spoofed webpage template with the link; and storing the spoofed webpage template in a set of spoofed webpage templates;

accessing a second inbound email;

scanning the second inbound email for links;

in response to detecting a second link in the second inbound email:

accessing a second target set of web content contained in a second target webpage at the second link;

extracting a second target set of visual features from the second set of web content; and identifying a particular spoofed webpage template, in the set of spoofed webpage templates, containing a particular set of spoofed features approximating the second target set of visual features; and in response to identifying the particular spoofed webpage template, flagging the second inbound email as malicious.

6. The method of claim 2, further comprising:

in response to the difference exceeding the threshold difference:

extracting a second set of visual features from the inbound email;

storing the second set of visual features in a spoofed email template; and storing the spoofed email template in a set of spoofed email templates;

accessing a second inbound email;

extracting a third set of visual features from the second inbound email; and identifying a particular spoofed email template, in the set of spoofed email templates, containing a particular set of spoofed features approximating the third set of visual features; and in response to identifying the particular spoofed email template, flagging the second inbound email as malicious.

7. The method of claim 2, further comprising:

accessing a second inbound email;

scanning the second inbound email for links;

in response to detecting a second link in the second inbound email:

accessing a second target set of web content contained in a second target webpage at the second link;

extracting a second target set of visual features from the second set of web content;

identifying a second verified webpage template, in the set of verified webpage templates, containing a second set of verified features approximating the second target set of visual features; and characterizing a second difference between the second link and a second verified resource locator associated with the second verified webpage template; and in response to the difference falling below the threshold difference, releasing the second inbound email to a recipient specified in the second inbound email.

8. The method of claim 2:

wherein extracting the target set of visual features from the set of web content comprises:

extracting a first set of words from text content contained in the target webpage; and recognizing a second set of words in images contained in the target webpage;

further comprising:

accessing a set of keywords, each keyword in the set of keywords present on a verified webpage represented in the set of verified webpage templates; and scanning the first set of words and the second set of words for an intersection with the set of keywords; and wherein identifying the particular verified webpage template containing the particular set of verified features approximating the target set of visual features comprises:

selecting a subset of verified webpage templates containing keywords in the intersection;

selectively scanning the subset of verified webpage templates for verified webpage templates representing verified features approximating the target set of visual features extracted from the target webpage; and identifying the particular verified webpage template, in the subset of verified webpage templates, containing the particular set of verified features nearest the target set of visual features.

9. The method of claim 8, further comprising:

accessing a second inbound email;

scanning the second inbound email for links;

in response to detecting a second link in the second inbound email:

accessing text content and images contained in a second target webpage at the second link;

extracting a third set of words from text content contained in the second target webpage;

recognizing a fourth set of words in images contained in the second target webpage;

extracting a second target set of visual features from the set of second web content;

scanning the third set of words and the fourth set of words for a second intersection with the set of keywords; and in response to the intersection containing a null set:

selectively scanning the set of verified webpage templates for verified webpage templates representing verified features approximating the second target set of visual features extracted from the second target webpage;

identifying a second verified webpage template, in the set of verified webpage templates, containing a second set of verified features nearest the second target set of visual features;

characterizing a feature difference between the second set of verified features and the second target set of visual features; and in response to the feature difference falling below a threshold feature difference, releasing the second inbound email to a recipient specified in the second inbound email.

10. A method for detecting spoofed webpages comprising:

accessing digital content;

scanning the digital content for links;

in response to detecting a link in the digital content:

accessing a target set of web content contained in a target webpage at the link;

extracting a target set of visual features from the set of web content, the target set of visual features comprising a target set of image features;

accessing a set of verified webpage templates;

for each verified webpage template in the set of verified webpage templates:

calculating a similarity score for the verified webpage template based on proximity of verified features represented in the verified webpage template to the target set of visual features;
identifying a particular verified webpage template corresponding to a highest similarity score greater than similarity scores of other verified webpage templates in the set of verified webpage templates;
in response to a particular similarity score of the particular verified webpage template exceeding a threshold score, matching the particular verified webpage template to the target webpage; and
characterizing a difference between the link and a particular verified resource locator associated with the particular verified webpage template; and
in response to the difference exceeding a threshold difference, flagging the digital content as malicious.

11. The method of claim 10:
wherein accessing digital content comprises accessing a PDF document, a multimedia message, a web page, or any combination thereof;
wherein extracting the target set of visual features comprises extracting a target set of alphanumeric characters; and
further comprising:
calculating a risk score for the digital content based on the difference; and
in response to the risk score exceeding a threshold difference score, flagging the digital content as malicious.

12. The method of claim 11, wherein flagging the digital content as malicious comprises:
labeling the digital content as malicious; and
transferring the digital content to a quarantine folder in an account associated with a recipient address.

13. The method of claim 11, wherein flagging the digital content as malicious comprises:
labeling the link in the digital content as malicious; and
redirecting the digital content from an inbox in an account associated with a recipient address to an administrator folder for administrator review.

14. The method of claim 11, further comprising:
scanning the target set of web content of the target webpage for credential input fields; and
scanning the target set of web content of the target webpage for broken links;
wherein identifying the particular verified webpage template comprises:
for each verified webpage template in the set of verified webpage templates, calculating a similarity score for the verified webpage template based on proximity of verified features represented in the verified webpage template to the target set of alphanumeric characters and the target set of image features; and
identifying the particular verified webpage template corresponding to a highest similarity score of verified webpage templates in the set of verified webpage templates; and
wherein calculating the risk score for the digital content comprises calculating the risk score for the digital content further based on:
a particular similarity score of the particular verified webpage template;
a frequency of credential input fields contained in the target webpage; and
a frequency of broken links contained in the target webpage.

15. The method of claim 11, further comprising:
scanning the target set of web content of the target of the webpage for a set of hyperlinks;
accessing a secondary set of web content contained in secondary webpages at the set of hyperlinks; and
scanning the target set of web content and the secondary set of web content for credential input fields; and
wherein calculating the risk score for the digital content comprises calculating the risk score for the digital content further based on:
a particular similarity score of the particular verified webpage template; and
a frequency of credential input fields contained in the target webpage.

16. The method of claim 11:
wherein extracting the target set of visual features from the target set of web content comprises extracting the target set of alphanumeric characters and the target set of image features comprising a target set of icons and a target set of colors from the target webpage;
wherein accessing the set of verified webpage templates comprises accessing a database of verified webpage templates, each verified webpage template in the database of verified webpage templates comprising a verified vector containing values representing alphanumeric characters, icons, and colors present in a verified webpage associated with a verified resource locator;
further comprising storing the target set of alphanumeric characters, the target set of icons, and the target set of colors from the target webpage in a target vector;
wherein identifying the particular verified webpage template comprises:
identifying the particular verified webpage template comprising a particular verified vector nearest the target vector in a multi-dimensional feature space;
characterizing a distance between the particular verified vector and the target vector in the multi-dimensional feature space; and
matching the particular verified webpage template to the target webpage based on the distance; and
wherein calculating the risk score for the digital content comprises calculating the risk score for the digital content further based on the distance.

17. The method of claim 11, wherein characterizing the difference between the link and the particular verified resource locator associated with the particular verified webpage template comprises:
extracting a target domain from the link;
extracting a particular domain from the particular verified resource locator; and
characterizing the difference between the target domain and the particular domain.

18. A system comprising:
one or more processors; and
one or more non-transitory computer-readable media storing computer-executable instructions that, when executed by the one or more processors, cause the one or more processors to perform operations comprising:
accessing a target set of web content contained in a target webpage;
extracting a target set of visual features from the target set of web content, the target set of visual features comprising a target set of alphanumeric characters;
accessing a set of verified webpage templates;
for each verified webpage template in the set of verified webpage templates:
calculating a similarity score for the verified webpage template based on proximity of verified features represented in the verified webpage template to the target set of visual features;

identifying a particular verified webpage template corresponding to the verified webpage template with the similarity score greater than similarity scores of other verified webpage templates in the set of verified webpage templates;

in response to a particular similarity score of the particular verified webpage template exceeding a threshold score, matching the particular verified webpage template to the target webpage;

characterizing a feature difference between the particular set of verified features and the target set of visual features; and in response to the feature difference exceeding a threshold feature difference, flagging the target webpage as malicious.

19. The system of claim 18, the operations further comprising:

accessing an inbound email; and scanning the inbound email for links;

wherein:

accessing the target set of web content comprises accessing the target set of web content contained in the target webpage at the link in the inbound email; and extracting the target set of visual features comprises extracting a target set of image features;

the operations further comprising:

in response to detecting a link embedded in the inbound email, characterizing a difference between the link and a particular verified resource locator associated with the particular verified webpage template; and in response to the difference exceeding a threshold difference, flagging the inbound email as malicious.

20. The system of claim 19, wherein:

accessing the target set of web content contained in the target webpage comprises loading the target webpage at the link;

extracting the target set of visual features from the target set of web content comprises extracting the target set of alphanumeric characters and the target set of image features comprising a target set of icons and a target set of colors from the target webpage;

identifying the particular verified webpage template comprises identifying the particular verified webpage template, from the set of verified webpage templates, representing alphanumeric characters, icons, and colors nearest the target set of alphanumeric characters, the target set of icons, and the target set of colors in the target set of visual features; and characterizing the difference between the link and the particular verified resource locator associated with the particular verified webpage template comprises:

extracting a target domain from the link;

extracting a particular domain from the particular verified resource locator; and characterizing the difference between the target domain and the particular domain; and wherein flagging the inbound email as malicious comprises flagging the inbound email as malicious in response to the target domain differing from the particular domain.

* * * * *